United States Patent
Koeppel

(10) Patent No.: US 11,580,507 B2
(45) Date of Patent: Feb. 14, 2023

(54) CAMERA ACTIVATION AND IMAGE PROCESSING FOR TRANSACTION VERIFICATION

(71) Applicant: Capital One Services, LLC, McLean, VA (US)

(72) Inventor: Adam Koeppel, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 5 days.

(21) Appl. No.: 16/170,754

(22) Filed: Oct. 25, 2018

(65) Prior Publication Data

US 2019/0122185 A1    Apr. 25, 2019

Related U.S. Application Data

(63) Continuation of application No. 15/792,537, filed on Oct. 24, 2017, now Pat. No. 10,115,083.

(51) Int. Cl.
G06Q 20/00     (2012.01)
G06Q 20/04     (2012.01)
(Continued)

(52) U.S. Cl.
CPC .......... *G06Q 20/047* (2020.05); *G06Q 10/10* (2013.01); *G06Q 20/209* (2013.01); *G06Q 20/322* (2013.01); *G06Q 20/327* (2013.01); *G06Q 20/3276* (2013.01); *G06Q 20/34* (2013.01); *G06Q 20/405* (2013.01); *G06Q 20/4015* (2020.05); *G06Q 20/4016* (2013.01); *G06Q 20/40145* (2013.01); *G06Q 20/425* (2013.01); *G06Q 30/06* (2013.01); *G06Q 40/02* (2013.01); *G06Q 40/125* (2013.12); *G06V 10/10* (2022.01); *H04W 4/02* (2013.01)

(58) Field of Classification Search
CPC ..... G06Q 20/0453; G06Q 40/125; G06K 9/20
USPC ...................................................... 705/16, 34
See application file for complete search history.

(56) References Cited

U.S. PATENT DOCUMENTS 5,914,472 A    6/1999  Foladare
7,783,515 B1   8/2010  Kumar et al.
(Continued)

FOREIGN PATENT DOCUMENTS

CN    203102459 U    7/2013

OTHER PUBLICATIONS

Extended European Search Report for Application No. EP18202247.5, dated Dec. 20, 2018, 9 pages.

*Primary Examiner* — Rokib Masud
(74) *Attorney, Agent, or Firm* — Harrity & Harrity, LLP

(57) ABSTRACT

A device may receive first information related to a transaction. The device may identify a first device from which to receive an image of a receipt related to the transaction. The device may provide, to the first device, a notification to cause the first device to perform a set of actions including activating a camera associated with the first device to capture the image of the receipt, or providing, for display, an instruction related to capturing the image of the receipt associated with the transaction. The device may receive, from the first device, the image of the receipt. The device may process the image of the receipt to perform an analysis of the transaction. The device may perform an action related to the transaction based on a result of processing the image of the receipt.

20 Claims, 8 Drawing Sheets

(51) Int. Cl.
  *G06Q 20/32* (2012.01)
  *H04W 4/02* (2018.01)
  *G06Q 10/10* (2023.01)
  *G06Q 40/02* (2023.01)
  *G06Q 30/06* (2023.01)
  *G06Q 20/40* (2012.01)
  *G06Q 40/12* (2023.01)
  *G06Q 20/42* (2012.01)
  *G06Q 20/34* (2012.01)
  *G06Q 20/20* (2012.01)
  *G06V 10/10* (2022.01)

(56) References Cited

U.S. PATENT DOCUMENTS

| | | |
|---|---|---|
| D651,237 S | 12/2011 | Mullen et al. |
| D651,238 S | 12/2011 | Mullen et al. |
| D651,644 S | 1/2012 | Mullen et al. |
| D652,075 S | 1/2012 | Mullen et al. |
| D652,076 S | 1/2012 | Mullen et al. |
| D652,448 S | 1/2012 | Mullen et al. |
| D652,449 S | 1/2012 | Mullen et al. |
| D652,450 S | 1/2012 | Mullen et al. |
| D652,867 S | 1/2012 | Mullen et al. |
| D653,288 S | 1/2012 | Mullen et al. |
| D665,022 S | 8/2012 | Mullen et al. |
| D665,447 S | 8/2012 | Mullen et al. |
| D666,241 S | 8/2012 | Mullen et al. |
| D670,329 S | 11/2012 | Mullen et al. |
| D670,330 S | 11/2012 | Mullen et al. |
| D670,331 S | 11/2012 | Mullen et al. |
| D670,332 S | 11/2012 | Mullen et al. |
| D670,759 S | 11/2012 | Mullen et al. |
| D672,389 S | 12/2012 | Mullen et al. |
| D673,606 S | 1/2013 | Mullen et al. |
| D674,013 S | 1/2013 | Mullen et al. |
| D675,256 S | 1/2013 | Mullen et al. |
| 8,359,239 B1 | 1/2013 | Cook et al. |
| D676,487 S | 2/2013 | Mullen et al. |
| D676,904 S | 2/2013 | Mullen et al. |
| D687,094 S | 7/2013 | Mullen et al. |
| D687,095 S | 7/2013 | Mullen et al. |
| D687,487 S | 8/2013 | Mullen et al. |
| D687,488 S | 8/2013 | Mullen et al. |
| D687,489 S | 8/2013 | Mullen et al. |
| D687,490 S | 8/2013 | Mullen et al. |
| D687,887 S | 8/2013 | Mullen et al. |
| D688,744 S | 8/2013 | Mullen et al. |
| D692,053 S | 10/2013 | Mullen et al. |
| 8,688,579 B1 * | 4/2014 | Ethington ............ G06V 30/416 705/42 |
| 9,208,528 B2 * | 12/2015 | Chelst .................. G06Q 40/125 |
| 9,491,224 B2 * | 11/2016 | Rezvani .............. H04L 12/2801 |
| 10,115,083 B1 | 10/2018 | Koeppel |
| 2003/0041329 A1 * | 2/2003 | Bassett .................. H04N 7/185 348/148 |
| 2004/0083134 A1 | 4/2004 | Spero |
| 2008/0035725 A1 * | 2/2008 | Jambunathan ......... G06Q 20/32 235/380 |
| 2012/0221446 A1 | 8/2012 | Grigg et al. |
| 2013/0129218 A1 * | 5/2013 | Barrett ................ G06Q 20/045 705/30 |
| 2014/0043485 A1 * | 2/2014 | Bateman ................ H04N 7/181 348/159 |
| 2014/0105510 A1 | 4/2014 | Chelst et al. |
| 2014/0195361 A1 | 7/2014 | Murphy et al. |
| 2015/0186892 A1 | 7/2015 | Zhang et al. |
| 2015/0347999 A1 * | 12/2015 | Lau ....................... G06Q 20/20 705/18 |
| 2016/0180323 A1 | 6/2016 | Gupta et al. |
| 2016/0248958 A1 * | 8/2016 | Yokomizo ............. G03B 7/091 |
| 2016/0350762 A1 | 12/2016 | Blanchard |

* cited by examiner

CAMERA ACTIVATION AND IMAGE PROCESSING FOR TRANSACTION VERIFICATION

RELATED APPLICATION

This application is a continuation of U.S. patent application Ser. No. 15/792,537 filed Oct. 24, 2017 (now U.S. Pat. No. 10,115,083), which is incorporated herein by reference.

BACKGROUND

A user device (e.g., a mobile phone, a camera phone, etc.) may be capable of capturing an image and/or video. The user device may use a built-in digital camera to capture the image and/or the video. A user device may send an image and/or video to another device. For example, the user device may send the image and/or video by sending a multimedia messaging service (MMS) message.

A receipt may include a written or digital acknowledgement that an individual or organization has received money or property in payment following a sale or other transfer of goods and/or a provision of a service. A receipt may include information identifying a date of a transaction (e.g., a date of purchase), a method of payment for a transaction, an amount of the transaction (e.g., an amount of a sale), an item or service associated with the transaction, and/or the like.

SUMMARY

According to some possible implementations, a device may include one or more memories, and one or more processors, communicatively coupled to the one or more memories, to receive, from a transaction terminal, first information related to a transaction. The transaction may be completed via the transaction terminal. The one or more processors may identify, based on receiving the first information, a user device. The one or more processors may provide, to the user device, a notification relating to the transaction. The notification may cause the user device to activate a camera associated with the user device, and the user device to provide, for display, an instruction. The instruction may relate to capturing an image of a receipt associated with the transaction. The one or more processors may receive, from the user device, the image of the receipt. The one or more processors may process the image of the receipt to perform an analysis of the transaction. The one or more processors may perform an action related to the transaction based on a result of processing the image of the receipt.

According to some possible implementations, a non-transitory computer-readable medium may store one or more instructions that, when executed by one or more processors, cause the one or more processors to receive first information related to a transaction. The one or more instructions, when executed by the one or more processors, may cause the one or more processors to identify a first device from which to receive an image of a receipt related to the transaction. The one or more instructions, when executed by the one or more processors, may cause the one or more processors to provide, to the first device, a notification to cause the first device to perform a set of actions including: activating a camera associated with the first device, the camera to be used to capture the image of the receipt, or providing, for display, an instruction related to capturing the image of the receipt associated with the transaction. The one or more instructions, when executed by the one or more processors, may cause the one or more processors to receive, from the first device, the image of the receipt.

The one or more instructions, when executed by the one or more processors, may cause the one or more processors to process the image of the receipt to perform an analysis of the transaction. The one or more instructions, when executed by the one or more processors, may cause the one or more processors to perform an action related to the transaction based on a result of processing the image of the receipt.

According to some possible implementations, a method may include receiving, by a first device, first information related to a transaction associated with a second device. The second device may include a transaction card, or a transaction terminal. The method may include identifying, by the first device, a third device from which to receive an image of a receipt related to the transaction or second information related to the transaction based on the first information. The method may include providing, by the first device and to the third device, a notification relating to the transaction to cause the third device to provide the image or the second information. The notification may cause the third device to activate a camera associated with the third device. The method may include receiving, by the first device and from the third device, the image of the receipt or the second information. The method may include processing, by first device, the image of the receipt or the second information to perform an analysis of the transaction. The method may include performing, by the first device, an action related to the transaction based on a result of processing the image of the receipt or the second information.

DETAILED DESCRIPTION

The following detailed description of example implementations refers to the accompanying drawings. The same reference numbers in different drawings may identify the same or similar elements.

A device, such as a transaction backend device, may process transactions on behalf of an organization (e.g., may process transactions related to operations of the organization, may process expenses of employees while on travel, expenses charged to a corporate account, etc.). The organization may have a set of rules related to transactions where a receipt or other information is submitted to the organization for the transaction to be verified and/or approved, to satisfy the set of rules, and/or the like. The device may not be capable of determining when a receipt or the other information is needed to verify and/or approve the transaction.

Some implementations, described herein, provide a device that is capable of determining that an individual needs to submit a receipt and/or other information for a transaction and prompting the individual, via a user device associated with the individual, for an image of a receipt or the other information related to the transaction. In addition, the device may process the image and/or the other information. In this way, the device may verify and/or approve the transaction based on processing the image of the receipt and/or the other information. This conserves computing resources that would otherwise be consumed by an individual using a device to manually review an image of a receipt and/or other information related to a transaction to verify and/or approve the transaction. Further, this reduces an amount of time needed to review, verify, and/or approve information related to a transaction, thereby increasing an efficiency of reviewing, verifying, and/or approving a transaction.

Figure 1:
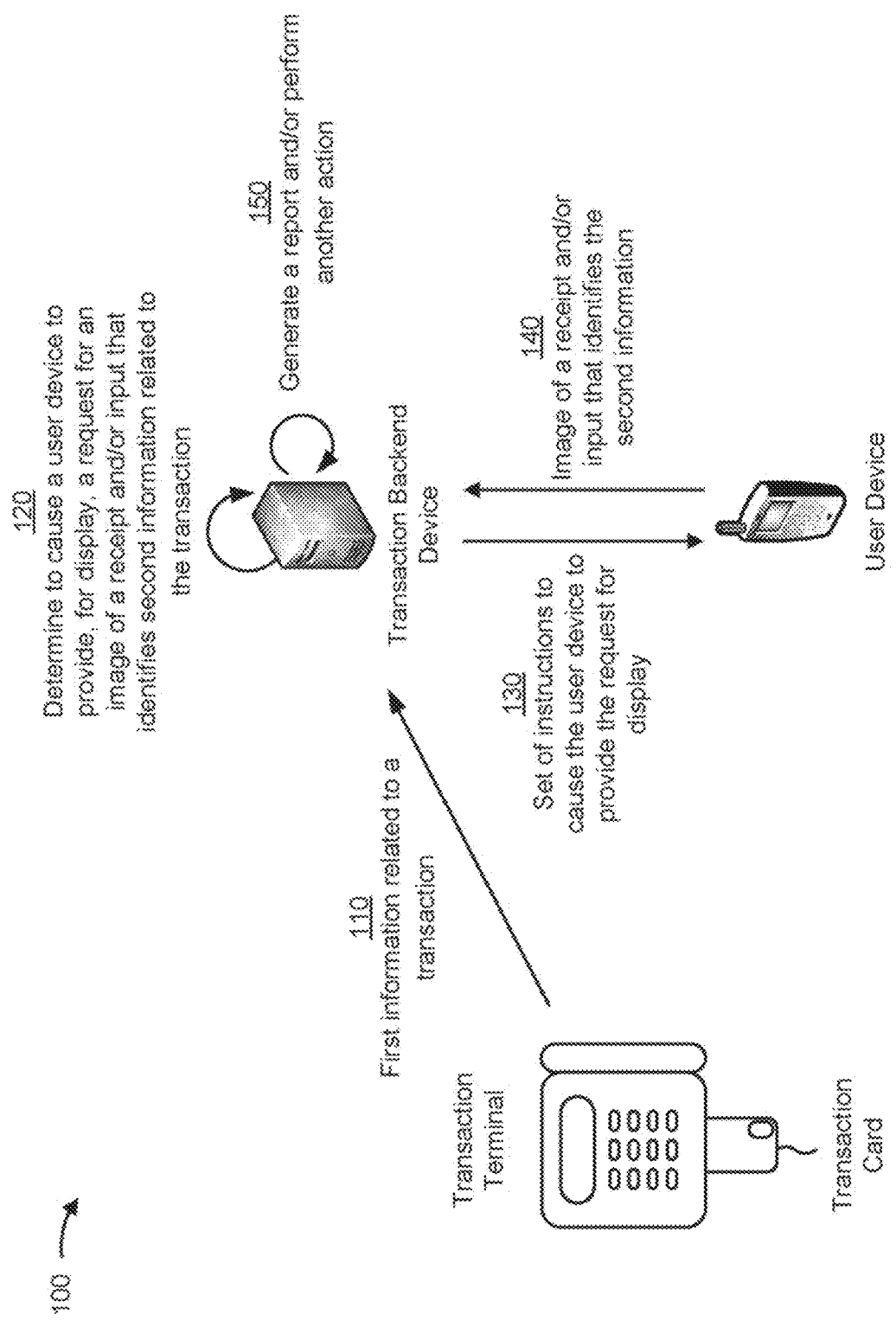
FIG. 1 is a diagram of an overview of an example implementation described herein.

FIG. 1 is a diagram of an overview of an example implementation 100 described herein. As shown in FIG. 1, example implementation 100 includes a transaction terminal, a transaction card, a user device, and a transaction backend device. As further shown in FIG. 1, the transaction card and the transaction terminal may be communicatively coupled in association with a cardholder of the transaction card using the transaction card to complete a transaction.

As shown in FIG. 1, and by reference number 110, the transaction terminal may provide first information related to a transaction (e.g., to the transaction backend device). For example, when the transaction card is communicatively coupled to the transaction terminal to complete a transaction, the transaction terminal may provide the first information to the transaction backend device to permit the transaction backend device to process the first information (e.g., to complete the transaction). The first information may identify a value associated with the transaction, a location of the transaction terminal, an identifier that identifies the transaction card, an identity of a cardholder of the transaction card, a party associated with the transaction (e.g., a seller of an item or a service provider), a date and/or time of the transaction, an item and/or service associated with the transaction (e.g., which the transaction card is being used to acquire), and/or the like. The transaction backend device may receive first information for hundreds, thousands, millions, billions, etc. of transactions.

As shown by reference number 120, the transaction backend device may determine to cause a user device to provide, for display, a request for an image of a receipt and/or input that identifies second information related to the transaction. The transaction backend device may process the first information and may determine to cause the user device to provide a request for display. For example, the transaction backend device may identify the transaction as a particular type of transaction, as being associated with a value that satisfies a threshold, as satisfying a set of rules based on one or more factors related to the transaction, and/or the like based on processing the first information.

As shown by reference number 130, the transaction backend device may provide, to the user device, a set of instructions to cause the user device to provide the request for display. For example, the set of instructions may cause the user device to provide a request for display that requests input of second information related to the transaction and/or that requests an image of a receipt related to the transaction. Additionally, or alternatively, and as another example, the set of instructions may cause the user device to automatically activate a camera associated with the user device (e.g., to permit a user of the user device to use the user device to capture an image of a receipt). This conserves computing resources that would otherwise be consumed by a user of the user device manually navigating via a user interface of the user device to activate the camera.

As shown by reference number 140, the user device may provide an image of a receipt and/or input that identifies the second information. For example, the user device may provide the image of the receipt after the user device receives input that causes a camera associated with the user device to capture an image of the receipt and/or the user device may provide the second information after receiving the second information as input from a user of the user device.

The second information may be similar to first information. Additionally, or alternatively, the second information may include other information related to verifying and/or approving the transaction. For example, the second information may identify individuals associated with the transaction (e.g., individuals who are not associated with the user device and/or the transaction card), a description of the transaction (e.g., an item and/or service purchased, a location at which an item and/or service was purchased, etc.), a context of the transaction (e.g., whether the transaction is associated with a business trip, whether the transaction was pre-approved, etc.), security information related to verifying a transaction (e.g., a personal identification number (PIN), a username/password combination, a signature of a user of the user device, biometric information, etc.).

As shown by reference number 150, the transaction backend device may generate a report and/or perform another action. For example, the transaction backend device may generate a report related to the transaction that identifies a value associated with the transaction, a description of the transaction, a set of individuals associated with the transaction, and/or the like.

The transaction backend device may perform another action related to the transaction after receiving the image of the receipt and/or the second information. For example, prior to or instead of generating the report, the transaction backend device may process the image of the receipt and/or the second information. For example, the transaction backend device may process the image of the receipt using an image processing technique, such as an optical character recognition (OCR) technique, a computer vision technique, a text recognition technique, and/or the like to identify text shown in the image (e.g., terms, phrases, numbers, symbols, etc.). Additionally, or alternatively, and as another example, the transaction backend device may process the second information using an input processing technique, such as a natural language processing technique, a speech-to-text technique, and/or the like, to identify terms and/or phrases included in the second information, such as terms and/or phrases identifying a value associated with the transaction, a set of individuals associated with the transaction, a description of the transaction, and/or the like.

The transaction backend device may perform an analysis of the first information, the second information, and/or the image of the receipt (e.g., text identified in the image of the receipt). For example, the transaction backend device may determine whether the first information, the second information, and/or information identified from the image match, satisfy a set of rules, and/or the like. The transaction backend device may perform an action based on a result of performing the analysis. For example, when the result of the analysis indicates a mismatch, the transaction backend device may trigger an alarm, may prevent a transaction from being completed, may send a message to another user device associated with another individual, and/or the like. Additionally, or alternatively, when the result of the analysis indicates a match, the transaction backend device may verify and/or approve the transaction, may provide a message to another user device associated with another individual, may submit a report (e.g., an expense report) to another device, and/or the like.

In this way, a transaction backend device may automatically process an image and/or information related to a transaction to verify and/or approve a transaction. This increases a security of transactions via real-time monitoring of the transactions. In addition, this increases an efficiency of verifying and/or approving a transaction via automatic prompting for an image of a receipt and/or information related to the transaction.

As indicated above, FIG. 1 is provided merely as an example. Other examples are possible and may differ from what was described with regard to FIG. 1. For example, rather than the transaction backend device determining to cause the user device to provide a request for display, the transaction card may perform this function and may provide a set of instructions to the user device, thereby conserving processing resources of the transaction backend device.

Figure 2:
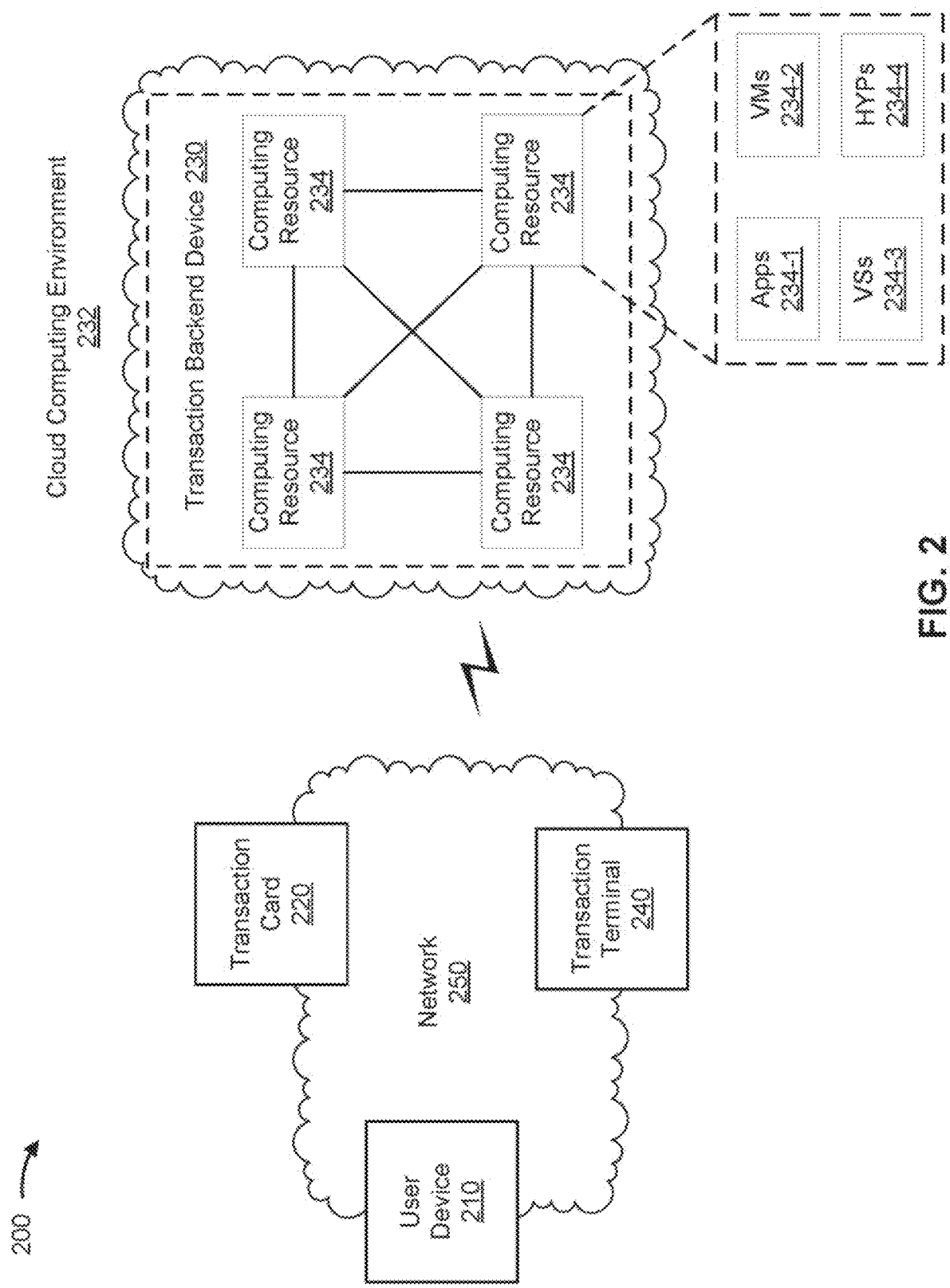
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a transaction card 220, a transaction backend device 230 provided within a cloud computing environment 232 that includes a set of computing resources 234, a transaction terminal 240, and a network 250. Devices of environment 200 may interconnect via wired connections, wireless connections, or a combination of wired and wireless connections.

User device 210 includes one or more devices capable of receiving, generating, storing, processing, and/or providing information associated with a transaction. For example, user device 210 may include a desktop computer, a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may receive, from transaction backend device 230, a request to provide an image of a receipt and/or information associated with a transaction, as described elsewhere herein. Additionally, or alternatively, user device 210 may provide the image of the receipt and/or the information related to the transaction to transaction backend device 230, as described elsewhere herein.

Transaction card 220 includes a transaction card that can be used to complete a transaction. For example, transaction card 220 may include a credit card, a debit card, a gift card, a payment card, an automated teller machine (ATM) card, a stored-value card, a fleet card, a virtual card implemented on user device 210, and/or the like. Transaction card 220 may be capable of storing and/or communicating data for a point-of-sale (PoS) transaction with transaction terminal 240. For example, transaction card 220 may store and/or communicate data, including account information (e.g., an account identifier, a cardholder identifier, etc.), expiration information of transaction card 220 (e.g., information identifying an expiration month and/or year of transaction card 220), banking information (e.g., a routing number of a bank, a bank identifier, etc.), transaction information (e.g., a payment token), and/or the like. For example, to store and/or communicate the data, transaction card 220 may include a magnetic strip and/or an integrated circuit (IC) chip (e.g., a EUROPAY®, MASTERCARD®, VISA® (EMV) chip).

Transaction card 220 may include an antenna to communicate data associated with transaction card 220. The antenna may be a passive radio frequency (RF) antenna, an active RF antenna, and/or a battery-assisted RF antenna. In some implementations, transaction card 220 may be a smart transaction card, capable of communicating wirelessly (e.g., via Bluetooth, Bluetooth Low Energy (BLE), near-field communication (NFC), and/or the like) with a computing device, such as user device 210, a digital wallet, and/or another device. In some implementations, transaction card 220 may communicate with transaction terminal 240 to complete a transaction (e.g., based on being moved within communicative proximity of transaction terminal 240), as described elsewhere herein.

Transaction backend device 230 includes one or more devices capable of authorizing and/or facilitating a transaction. For example, transaction backend device 230 may include one or more servers and/or computers to store and/or provide information associated with processing a transaction via transaction terminal 240. In some implementations, transaction backend device 230 may request an image of a receipt and/or information related to a transaction from user device 210, as described elsewhere herein. Additionally, or alternatively, transaction backend device 230 may process the image and/or the information to perform an analysis of the transaction, as described elsewhere herein.

Transaction backend device 230 may include one or more devices associated with a financial institution (e.g., a bank, a lender, a credit union, etc.) and/or a transaction card association that authorizes a transaction and/or facilitates a transfer of funds or payment between an account associated with a cardholder of transaction card 220 and an account of an individual or business associated with transaction terminal 240. For example, transaction backend device 230 may include one or more devices of one or more issuing banks associated with a cardholder of transaction card 220, one or more devices of one or more acquiring banks (or merchant banks) associated with transaction terminal 240, and/or one or more devices associated with one or more transaction card associations (e.g., VISA®, MASTERCARD®, and/or the like) associated with transaction card 220. Accordingly, based on receiving information associated with transaction card 220 from transaction terminal 240, devices of transaction backend device 230 (e.g., associated with a financial institution or transaction card association) may communicate to authorize a transaction and/or transfer funds between the accounts associated with transaction card 220 and/or transaction terminal 240.

Transaction backend device 230 may provide or deny authorization associated with a transaction. For example, transaction backend device 230 may store and/or provide information that may allow, or deny, access through an access point (e.g., a gate, a door, and/or the like) of a secure location (e.g., a room, a building, a geographical area, a transportation terminal, and/or the like) based on information (e.g., account information, a key, an identifier, credentials, and/or the like) associated with transaction card 220 and/or provided by transaction terminal 240.

Transaction backend device 230 may include one or more devices associated with a rewards program associated with transaction card 220 and/or an entity (e.g., a financial institution, a merchant, a service provider, a vendor, and/or the like) associated with transaction card 220 and/or transaction terminal 240. For example, transaction backend device 230 may authorize the earning and/or redemption of rewards (e.g., rewards points associated with transaction card 220, cash rewards, client loyalty rewards associated with an entity associated with transaction terminal 240, and/or the like) based on a transaction processed by transaction terminal 240.

In some implementations, as shown in FIG. 2, transaction backend device 230 may be hosted in cloud computing environment 232. Notably, while implementations described herein describe transaction backend device 230 as being hosted in cloud computing environment 232, in some implementations, transaction backend device 230 may not be cloud-based (i.e., may be implemented outside of a cloud computing environment) or may be partially cloud-based.

Cloud computing environment 232 includes an environment that hosts transaction backend device 230. Cloud computing environment 232 may provide computation, software, data access, storage, and/or other services that do not require end-user knowledge of a physical location and configuration of a system and/or a device that hosts transaction backend device 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host transaction backend device 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, and/or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with transaction backend device 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210, an operator of transaction backend device 230, an organization associated with transaction backend device 230, etc.), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Although transaction backend device 230 may be shown and/or described herein as a single device, in some implementations, transaction backend device 230 may be multiple devices. For example, transaction backend device 230 may include a transaction processing device that receives transaction-related information from transaction terminal 240 and determines whether to approve a transaction and/or an expensing/receipt device that receives transaction-related information from the transaction processing device and determines whether an image of a receipt for the transaction is needed.

Transaction terminal 240 includes one or more devices capable of facilitating processing of a transaction associated with transaction card 220. For example, transaction terminal 240 may include a point-of-sale (PoS) terminal, a payment terminal (e.g., a credit card terminal, a contactless payment terminal, a mobile credit card reader, a chip reader, etc.), a security access terminal, an automated teller machine (ATM) terminal, and/or the like. In some implementations, transaction terminal 240 may communicate with transaction backend device 230 to provide, to transaction backend device 230, information related to a transaction for which transaction card 220 is being used, as described elsewhere herein.

In some implementations, transaction terminal 240 may include one or more input components and/or output components to facilitate obtaining information from transaction card 220 (e.g., an account number of an account associated with transaction card 220, an expiration date of transaction card 220, etc.), input (e.g., a PIN, a signature, biometric information, etc.), from a cardholder of transaction card 220, related to completing and/or authorizing a transaction, and/or the like. In some implementations, example input components of transaction terminal 240 may include a number keypad, a touchscreen, a magnetic strip reader, a chip reader, a pen and corresponding signature pad, an RF signal reader, and/or the like.

In some implementations, a magnetic strip reader of transaction terminal 240 may receive data from transaction card 220 as a magnetic strip of transaction card 220 is swiped along the magnetic strip reader. In some implementations, a chip reader of transaction terminal 240 may receive data from transaction card 220 via an integrated circuit chip (e.g., an EMV chip) of transaction card 220 when the chip is placed within communicative proximity of the chip reader. In some implementations, an RF signal reader of transaction terminal 240 may enable a contactless transaction from transaction card 220 and/or user device 210 by obtaining data wirelessly from transaction card 220 and/or user device 210 as transaction card 220 and/or user device 210 comes within communicative proximity of transaction terminal 240, such that the RF signal reader detects an RF signal from an RF antenna of transaction card 220 and/or user device 210.

In some implementations, example output components of transaction terminal 240 may include a display, a speaker, a printer, a light, and/or the like. In some implementations, transaction terminal 240 may use an output component to output information related to a transaction (e.g., an indication to cause a user to input information to authorize a transaction, information that identifies whether a transaction was completed, etc.).

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
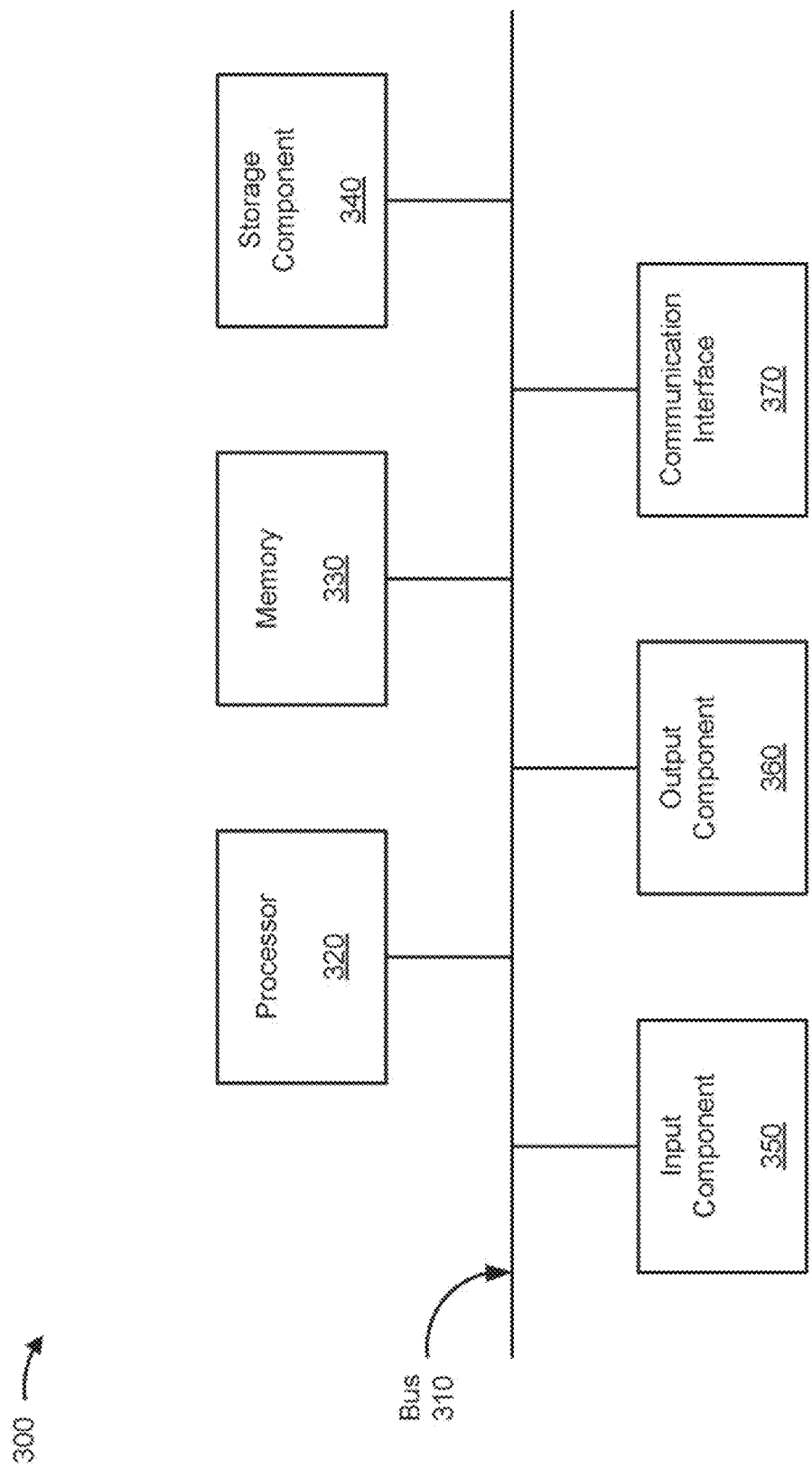
FIG. 3 is a diagram of example components of one or more devices of FIG. 2.

FIG. 3 is a diagram of example components of a device 300. Device 300 may correspond to user device 210, transaction card 220, transaction backend device 230, computing resource 234, and/or transaction terminal 240. In some implementations, user device 210, transaction card 220, transaction backend device 230, computing resource 234, and/or transaction terminal 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
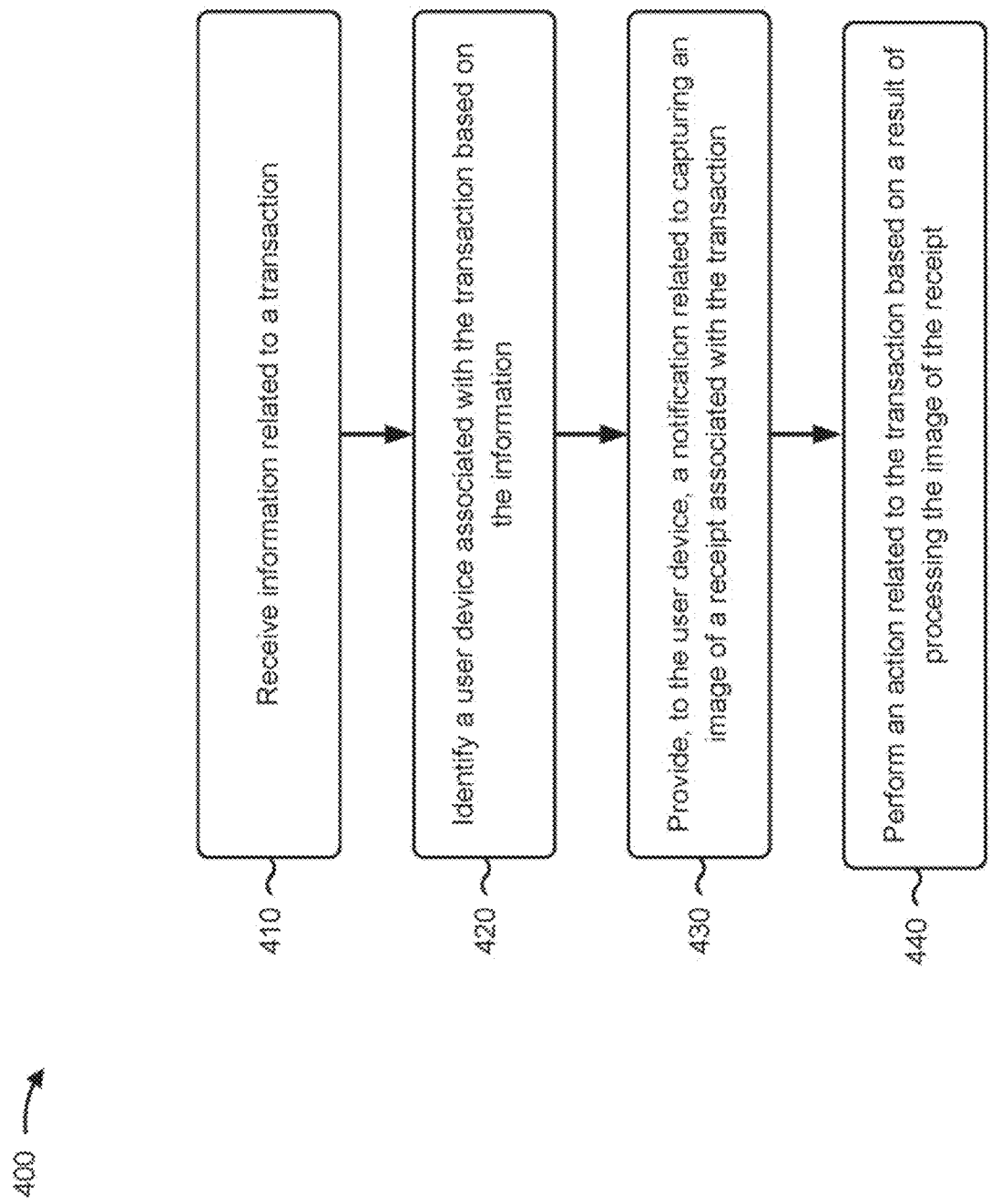
FIG. 4 is a flow chart of an example process for camera activation and image processing for transaction verification.

FIG. 4 is a flow chart of an example process 400 for camera activation and image processing for transaction verification. In some implementations, one or more process blocks of FIG. 4 may be performed by transaction backend device 230. In some implementations, one or more process blocks of FIG. 4 may be performed by another device or a group of devices separate from or including transaction backend device 230, such as user device 210, transaction card 220, and transaction terminal 240.

As shown in FIG. 4, process 400 may include receiving information related to a transaction (block 410). For example, transaction backend device 230 may receive information related to a transaction from user device 210 and/or transaction terminal 240. In some implementations, transaction backend device 230 may receive the information periodically, according to a schedule, based on requesting the information, based on a cardholder of transaction card 220 using transaction card 220 to complete a transaction, and/or the like.

In some implementations, a transaction may include an exchange between two or more parties (e.g., individuals, organizations, governmental entities, a combination of different types of parties, etc.). For example, a transaction may include an exchange of money, rewards points, store credit, bank credit, or another type of value for an item, a service, and/or the like between two or more parties.

In some implementations, the information may identify a type of a transaction (e.g., retail, service, etc.), a value provided in association with the transaction, an item, service, and/or the like provided in association with the transaction, a location the transaction (e.g., a location of transaction terminal 240 being used to complete the transaction), an account associated with transaction card 220 being used to complete the transaction, and/or the like. Additionally, or alternatively, the information may identify transaction card 220 and/or information related to transaction card 220 (e.g., an expiration date, a personal identification number (PIN) provided by a user of transaction terminal 240, a card security code related to transaction card 220, etc.), a cardholder of transaction card 220, a date and/or time of the transaction, and/or the like.

In some implementations, transaction backend device 230 may receive the information from transaction terminal 240. For example, transaction backend device 230 may receive the information from transaction terminal 240 when a cardholder of transaction card 220 moves transaction card 220 within communicative proximity of transaction terminal 240. Additionally, or alternatively, transaction backend device 230 may receive the information from user device 210. For example, transaction backend device 230 may receive the information when a user of user device 210 moves user device 210 within communicative proximity of transaction terminal 240 to complete a transaction. Additionally, or alternatively, and as another example, transaction backend device 230 may receive the information from user device 210 after user device 210 receives the information from transaction card 220 when transaction card 220 is moved within communicative proximity of transaction terminal 240 (e.g., via a wireless connection between user device 210 and transaction card 220).

In some implementations, transaction backend device 230 may process the information (e.g., after receiving the information). For example, transaction backend device 230 may process the information to determine whether to provide a notification to user device 210 related to capturing an image of a receipt associated with the transaction and/or related to providing other information associated with the transaction.

In some implementations, transaction backend device 230 may process the information to identify a particular identifier included in the information and may determine to provide a notification to user device 210 based on the particular identifier being included in the information. For example, transaction backend device 230 may determine that the information includes an identifier that identifies a retailer with which transaction card 220 is being used, and may determine to provide a notification to user device 210 based on the information including the identifier for the retailer.

Additionally, or alternatively, transaction backend device 230 may process the information using a set of rules and may determine to provide a notification related to capturing an image and/or inputting other information to user device 210 based on the information satisfying the set of rules. For example, the set of rules may relate to a threshold value associated with a transaction, a party associated with a transaction, a date and/or time of a transaction, a location of transaction terminal 240 being used to complete a transaction, a type of a transaction, an item and/or a service being provided in association with a transaction, and/or the like. Continuing with the previous example, transaction backend device 230 may determine that a value associated with a transaction satisfies a threshold and may determine to provide a notification to user device 210 based on the value satisfying the threshold.

In some implementations, transaction backend device 230 may determine whether a combination of rules is satisfied and may determine whether to provide a notification to user device 210 based on a result of determining whether the combination of rules is satisfied. For example, transaction backend device 230 may determine whether a first rule and a second rule are satisfied, and may determine whether to provide a notification to user device 210 based on a result of determining whether the first rule and the second rule are satisfied. Continuing with the previous example, transaction backend device 230 may determine that a value associated with a transaction satisfies a threshold and that the information identifies a particular party associated with the transaction, and may determine to provide a notification to user device 210 based on the value satisfying the threshold and based on the particular party being associated with the transaction.

Additionally, or alternatively, transaction backend device 230 may determine a score for the information and may determine whether to provide a notification to user device 210 based on the score (e.g., whether the score has a particular value, whether the score satisfies a threshold, whether the score differs from another score by a threshold amount, etc.). For example, the score may indicate a likelihood that the transaction is a transaction for which transaction backend device 230 needs to provide a notification, a likelihood that a transaction is a particular type of transaction (e.g., a personal expense rather than a work-related expense, a fraudulent expense, an unpermitted expense, etc.), and/or the like.

In some implementations, transaction backend device 230 may process the information using machine learning, artificial intelligence, and/or the like to determine whether to provide a notification to user device 210 (e.g., based on identifying a transaction as a particular type of transaction, based on determining whether information related to a transaction is similar to information related to another transaction, etc.). For example, transaction backend device 230 may process a training set of data (e.g., related to historical transactions) to generate a data model related to transactions. Additionally, or alternatively, transaction backend device 230 may receive a trained data model (e.g., from another transaction backend device 230, input by a user of another device, such as user device 210, etc.), and may use the received data model to process the information related to a transaction.

In some implementations, transaction backend device 230 may use supervised and/or unsupervised machine learning. For example, for unsupervised machine learning, transaction backend device 230 may group portions of information into a training data set, a validation data set, and a test data set to permit transaction backend device 230 to generate a model related to the data. In some implementations, and prior to training, transaction backend device 230 may extract features of the information, collate information from different sources, and/or the like to prepare to perform machine learning.

In this way, transaction backend device 230 may use one or more techniques to determine information from complicated and/or imprecise data via use of machine learning, artificial intelligence, and/or the like. In addition, in this way, transaction backend device 230 may process noisy and/or incomplete data via use of machine learning, artificial intelligence, and/or the like, thereby improving processing of data. This permits transaction backend device 230 to extract patterns and/or detect trends in data that cannot be extracted or detected by a human. In addition, this permits transaction backend device 230 to process data when algorithmic methods of processing the data would consume significant processing resources of transaction backend device 230.

In some implementations, transaction backend device 230 may determine a score based on a combination of identifiers included in the information (e.g., a first combination of identifiers in the information may cause transaction backend device 230 to determine a different score for the information than a second combination of identifiers). Additionally, or alternatively, transaction backend device 230 may determine a score based on the information satisfying a combination of rules (e.g., satisfaction of a first combination of rules may cause transaction backend device 230 to determine a different score than for satisfaction of a second combination of rules).

In some implementations, transaction backend device 230 may determine scores for data elements included in the information and may determine a total score for the information based on the scores for the data elements. For example, transaction backend device 230 may determine the total score for the information by weighting scores for data elements, summing scores for data elements, applying a function to scores for data elements, and/or the like.

Additionally, or alternatively, transaction backend device 230 may determine whether a transaction is similar to another transaction. For example, transaction backend device 230 may determine whether two or more transactions are associated with a value that differs by a threshold amount, are associated with the same or similar parties, are associated with the same location or locations that differ by a threshold distance, and/or the like. In some implementations, transaction backend device 230 may determine whether a transaction is similar to another transaction based on machine learning, artificial intelligence, and/or the like.

In this way, transaction backend device 230 may receive information related to a transaction to permit transaction backend device 230 to identify user device 210 associated with the transaction.

As further shown in FIG. 4, process 400 may include identifying a user device associated with the transaction based on the information (block 420). For example, transaction backend device 230 may identify a particular user device 210 associated with the transaction based on the information. In some implementations, transaction backend device 230 may identify user device 210 after determining to provide a notification to user device 210 associated with the transaction.

In some implementations, transaction backend device 230 may identify user device 210 using a data structure. For example, the data structure may include information identifying corresponding transaction cards 220, user devices 210, and/or individuals. In some implementations, transaction backend device 230 may perform a lookup of information (e.g., received from transaction terminal 240) and may identify user device 210 based on a result of performing the lookup. For example, transaction backend device 230 may process information from transaction terminal 240 to identify transaction card 220 being used to complete a transaction, a cardholder of transaction card 220, and/or the like. Continuing with the previous example, transaction backend device 230 may perform a lookup of the information identifying transaction card 220 and/or a cardholder of transaction card 220 in a data structure and may identify a corresponding user device 210 where a result of the lookup indicates a match.

Additionally, or alternatively, transaction backend device 230 may identify user device 210 based on an identifier included in the information received from transaction terminal 240. For example, when user device 210 is used to complete a transaction (e.g., a mobile payment transaction, such as a Quick Response (QR) code transaction, an RF transaction, an audio signal-based transaction, etc.), the information that transaction backend device 230 receives from transaction terminal 240 may include information identifying user device 210 associated with the transaction.

Additionally, or alternatively, transaction backend device 230 may identify user device 210 based on a location of another device. For example, transaction backend device 230 may determine a geographic location of transaction card 220 and/or transaction terminal 240 when transaction card 220 is used to complete a transaction (e.g., based on information received from transaction terminal 240) and may use a data structure that identifies geographic locations of user devices 210 to identify a particular user device 210 that is in the same geographic location as transaction card 220 and/or transaction terminal 240 (e.g., within a threshold distance of a geographic location of transaction card 220 and/or transaction terminal 240).

In this way, transaction backend device 230 may identify user device 210 associated with the transaction based on the information.

As further shown in FIG. 4, process 400 may include providing, to the user device, a notification related to capturing an image of a receipt associated with the transaction (block 430). For example, transaction backend device 230 may provide, to user device 210, a notification related to capturing an image of a receipt associated with a transaction (e.g., an instruction to cause user device 210 to automatically activate a camera and/or automatically capture the image of the receipt). Additionally, or alternatively, a notification may relate to causing a user of user device 210 to provide input related to the transaction to user device 210. For example, a notification may include text instructing a user of user device 210 to input information related to a transaction, as described in more detail elsewhere herein. In some implementations, transaction backend device 230 may provide a notification to user device 210 after identifying user device 210, based on input from a user of transaction backend device 230, at a time of a transaction, periodically, according to a schedule, and/or the like.

In some implementations, transaction backend device 230 may provide a notification for display via a display of user device 210. For example, the notification, when displayed via a display of user device 210, may include text indicating that an image and/or other information related to a transaction is needed for approval and/or verification of a transaction. In some implementations, user device 210 may provide a notification from transaction backend device 230 for display after receiving the notification, and may capture an image of a receipt associated with the transaction (e.g., based on input from a user of user device 210).

In this way, transaction backend device 230 may provide, to user device 210, a notification related to capturing an image of a receipt associated with the transaction.

As further shown in FIG. 4, process 400 may include performing an action related to the transaction based on a result of processing the image of the receipt (block 440). For example, transaction backend device 230 may perform an action related to the transaction based on a result of processing the image of the receipt.

In some implementations, transaction backend device 230 may receive an image (e.g., from user device 210). Additionally, or alternatively, transaction backend device 230 may receive another image. For example, transaction backend device 230 may receive an image of a set of individuals associated with a transaction, an image of transaction card 220, and/or the like (e.g., based on providing a notification to user device 210 related to capturing an image of a set of individuals, transaction card 220, etc.).

In some implementations, transaction backend device 230 may receive other information related to a transaction from user device 210 (e.g., as input from a user of user device 210). For example, a user of user device 210 may input other information that identifies a user of user device 210, a value associated with a transaction, a set of individuals associated with the transaction, a service and/or item associated with a transaction, and/or the like. Additionally, or alternatively, the other information may include a signature, a personal identification number (PIN), a username/password combination, security token, biometric information (e.g., a set of spoken words, an image of the face of the user of user device 210, a fingerprint scan, etc.), and/or the like.

In some implementations, transaction backend device 230 may process the image. For example, transaction backend device 230 may process the image using an image processing technique (e.g., a computer vision technique, an optical character recognition (OCR) technique, a shape detection technique, a face detection technique, etc.) to identify text in the image, an object shown in the image (e.g., a receipt), an individual shown in the image, and/or the like.

In some implementations, transaction backend device 230 may perform an analysis of the transaction. For example, transaction backend device 230 may perform an analysis of information received from transaction terminal 240 when transaction card 220 is used to complete the transaction, other information received from user device 210, and/or an image received from user device 210.

In some implementations, transaction backend device 230 may determine whether the information, the other information, and/or information identified in an image match. For example, transaction backend device 230 may determine whether a value for a transaction matches, or a difference in values satisfies a threshold, across the information from transaction terminal 240, user device 210, and/or identified in the image. Additionally, or alternatively, and as another example, transaction backend device 230 may determine whether an individual identified in an image from user device 210 matches an individual identified in the information received from transaction terminal 240 and/or user device 210. In some implementations, transaction backend device 230 may trigger an alarm when transaction backend device 230 identifies a mismatch in information from transaction terminal 240, user device 210, and/or identified in an image.

In some implementations, transaction backend device 230 may approve a transaction. For example, transaction backend device 230 may determine whether the transaction satisfies a set of rules based on the information from transaction terminal 240, user device 210, and/or identified in an image. Continuing with the previous example, transaction backend device 230 may approve a transaction when a result of processing the information from transaction terminal 240, user device 210, and/or an image indicates that a set of rules is satisfied.

In some implementations, transaction backend device 230 may verify a transaction. For example, transaction backend device 230 may request input from a user of user device 210 that indicates whether the user is using transaction card 220 to complete a transaction. Additionally, or alternatively, and as another example, transaction backend device 230 may request input from a user of user device 210 that includes security information (e.g., a PIN, a username/password combination, biometric information, etc.) to confirm that a user of user device 210 is a cardholder of transaction card 220. This increases a security of a transaction, by reducing or eliminating fraudulent use of transaction card 220.

In some implementations, transaction backend device 230 may generate a report. For example, transaction backend device 230 may generate a report (e.g., an expense report) that includes (e.g., is populated with) information from transaction terminal 240, user device 210, identified in an image, and/or the like. Additionally, or alternatively, and as another example, transaction backend device 230 may generate a report that identifies a result of performing an analysis related to the transaction.

In some implementations, transaction backend device 230 may provide a report for display. For example, transaction backend device 230 may provide a report for display via a display of user device 210 associated with the transaction (e.g., to permit and/or request input from a user of user device 210 that confirms an accuracy of a generated report), an individual associated with reviewing and/or approving the transaction, and/or the like. In some implementations, transaction backend device 230 may request and/or receive input from a user of user device 210 that identifies whether a user of user device 210 has reviewed a report and/or transaction, has approved a report and/or transaction, has verified a report and/or transaction, and/or the like.

In some implementations, transaction backend device 230 may send a message. For example, transaction backend device 230 may send a message to user device 210 associated with a cardholder of transaction card 220, an individual associated with reviewing and/or approving a transaction, and/or the like. Continuing with the previous example, the message may identify information and/or an image associated with a transaction, a result of performing an analysis, and/or the like. Additionally, or alternatively, transaction backend device 230 may schedule a meeting. For example, transaction backend device 230 may schedule a meeting among various individuals using electronic calendars associated with the various individuals to identify an available time (e.g., a meeting to discuss a transaction, to review a transaction, etc.).

In this way, transaction backend device 230 may perform an action related to the transaction based on a result of processing the image of the receipt.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
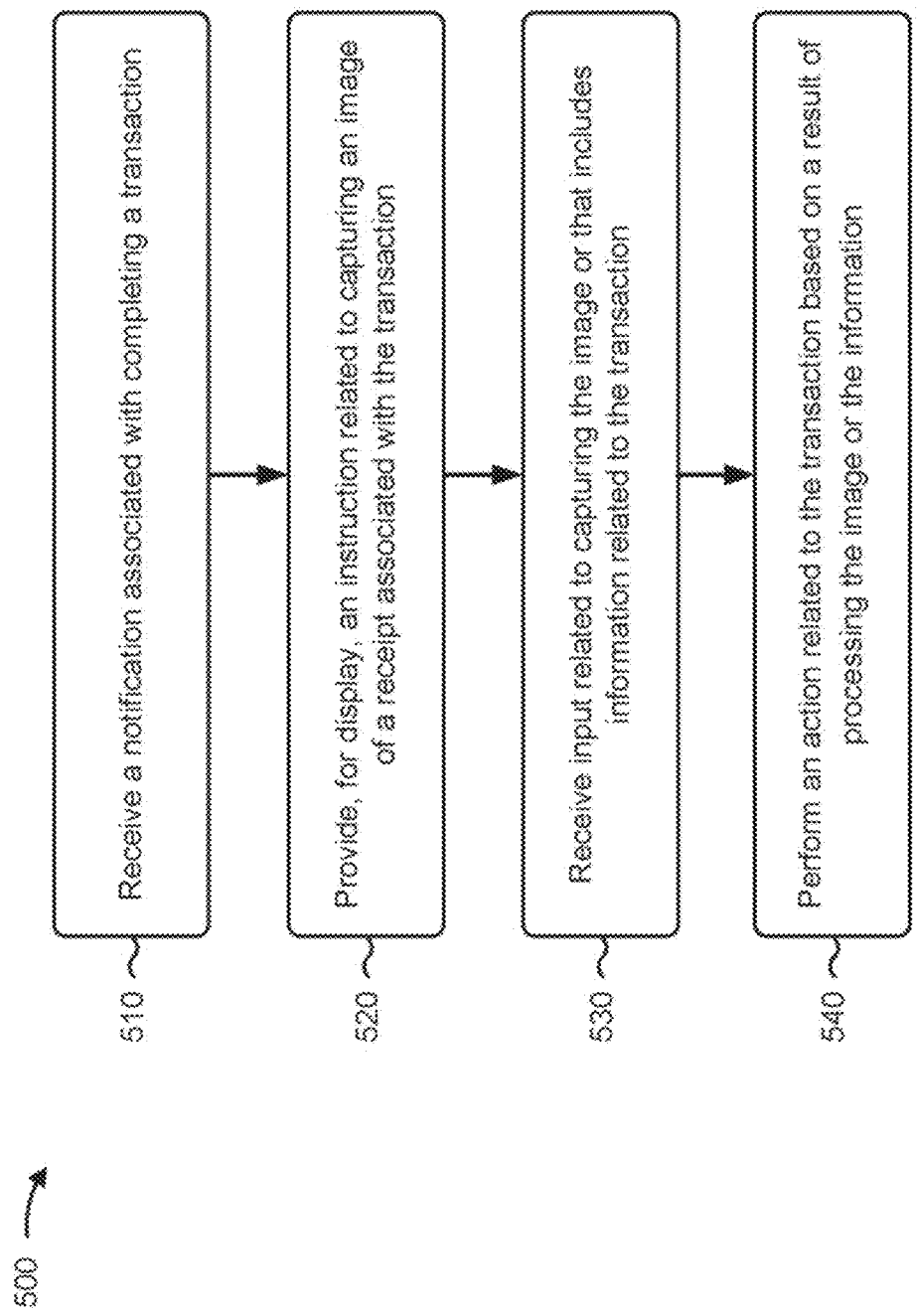
FIG. 5 is a flow chart of an example process for camera activation and image processing for transaction verification.

FIG. 5 is a flow chart of an example process 500 for camera activation and image processing for transaction verification. In some implementations, one or more process blocks of FIG. 5 may be performed by user device 210. In some implementations, one or more process blocks of FIG. 5 may be performed by another device or a group of devices separate from or including user device 210, such as transaction card 220, transaction backend device 230, and transaction terminal 240.

As shown in FIG. 5, process 500 may include receiving a notification associated with completing a transaction (block 510). For example, user device 210 may receive a notification associated with completing a transaction from transaction backend device 230, transaction terminal 240 (e.g., via transaction card 220 or directly via a connection between user device 210 and transaction terminal 240). In some implementations, user device 210 may receive a notification periodically, according to a schedule, when a transaction occurs, and/or the like.

In some implementations, a notification may be associated with completing a transaction. For example, a notification may be associated with a request from transaction backend device 230 for an image, information, and/or the like. Continuing with the previous example, a notification may be associated with a request for an image of a receipt associated with a transaction, information related to the transaction, and/or the like, similar to that described elsewhere herein.

In some implementations, user device 210 may activate one or more sensors related to capturing an image (e.g., one or more sensors associated with a camera associated with user device 210). For example, the one or more sensors may be related to capturing an image of a receipt related to a transaction, an individual related to a transaction, and/or the like. In some implementations, user device 210 may activate the one or more sensors automatically based on receiving the notification.

In this way, user device 210 may receive a notification associated with completing a transaction.

As further shown in FIG. 5, process 500 may include providing, for display, an instruction related to capturing an image of a receipt associated with the transaction (block 520). For example, user device 210 may provide, for display, an instruction related to capturing an image of a receipt associated with the transaction (e.g., via a display associated with user device 210).

In some implementations, an instruction may include information instructing a user of user device 210 to capture an image of a receipt related to a transaction, an image of an individual related to a transaction, transaction card 220 related to a transaction, and/or the like. Additionally, or alternatively, an instruction may include information instructing a user of user device 210 to capture an image of a barcode, a Quick Response (QR) code, and/or the like on a receipt associated with a transaction.

In some implementations, an instruction may include information instructing a user of user device 210 to input information related to a transaction. For example, the information may be similar to that described elsewhere herein (e.g., may identify a value of a transaction, may identify an individual associated with a transaction, may include security information related to verifying a transaction, etc.).

In this way, user device 210 may provide, for display, an instruction related to capturing an image prior to receiving input related to capturing the image.

As further shown in FIG. 5, process 500 may include receiving input related to capturing the image or that includes information related to the transaction (block 530). For example, user device 210 may receive input related to capturing the image or that includes information related to the transaction. In some implementations, user device 210 may receive input based on providing an instruction for display, when user device 210 provides an instruction for display, at a later time from when user device 210 provides an instruction for display, and/or the like.

In some implementations, user device 210 may receive input based on user selection of a button displayed on a user interface (e.g., manual input). Additionally, or alternatively, user device 210 may receive input based on a user of user device 210 speaking in a microphone associated with user device 210 (e.g., voice input). Additionally, or alternatively, user device 210 may receive input based on a user selecting a button on a housing of user device 210 (e.g., mechanical input). Additionally, or alternatively, user device 210 may receive input in the form of text input (e.g., text input that includes information related to the transaction).

Additionally, or alternatively, user device 210 may initiate a timer that indicates an amount of time to when user device 210 will capture an image automatically. For example, the timer may provide a user of user device 210 with an amount of time to focus the camera on a receipt, an individual, and/or the like associated with a transaction.

In some implementations, user device 210 may capture an image based on receiving input (e.g., input that causes a camera associated with user device 210 to capture an image). For example, user device 210 may capture an image of a receipt related to a transaction, an individual related to a transaction, transaction card 220, and/or the like.

In some implementations, user device 210 may process an image and/or information related to a transaction. For example, user device 210 may process an image and/or information related to a transaction in a manner similar to that described elsewhere herein. In some implementations, user device 210 may process an image and/or information related to a transaction to perform an analysis related to the transaction. For example, user device 210 may perform an analysis of an image and/or information related to a transaction in a manner similar to that described elsewhere herein.

Additionally, or alternatively, user device 210 may provide an image and/or information related to a transaction to transaction backend device 230. For example, user device 210 may provide the image and/or the information related to the transaction to transaction backend device 230 to permit transaction backend device 230 to process the image and/or the information.

In this way, user device 210 may receive input related to capturing the image or that includes information related to the transaction prior to performing an action related to the transaction.

As further shown in FIG. 5, process 500 may include performing an action related to the transaction based on a result of processing the image or the information (block 540). For example, user device 210 may perform an action related to the transaction based on a result of processing the image or the information. In some implementations, user device 210 may perform an action similar to that described elsewhere herein.

In some implementations, user device 210 may provide information related to the transaction to transaction backend device 230 and/or another device. For example, user device 210 may provide an image, information related to a transaction, a result of performing an analysis, and/or the like to transaction backend device 230 and/or another user device 210 (e.g., to permit transaction backend device 230 and/or user device 210 to approve a transaction, to update an account associated with transaction card 220 and/or user device 210, etc.).

Additionally, or alternatively, user device 210 may send an instruction to deny a transaction. For example, user device 210 may send an instruction to transaction terminal 240 and/or transaction card 220 to deny a transaction.

In this way, user device 210 may perform an action related to the transaction based on a result of processing the image or the information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
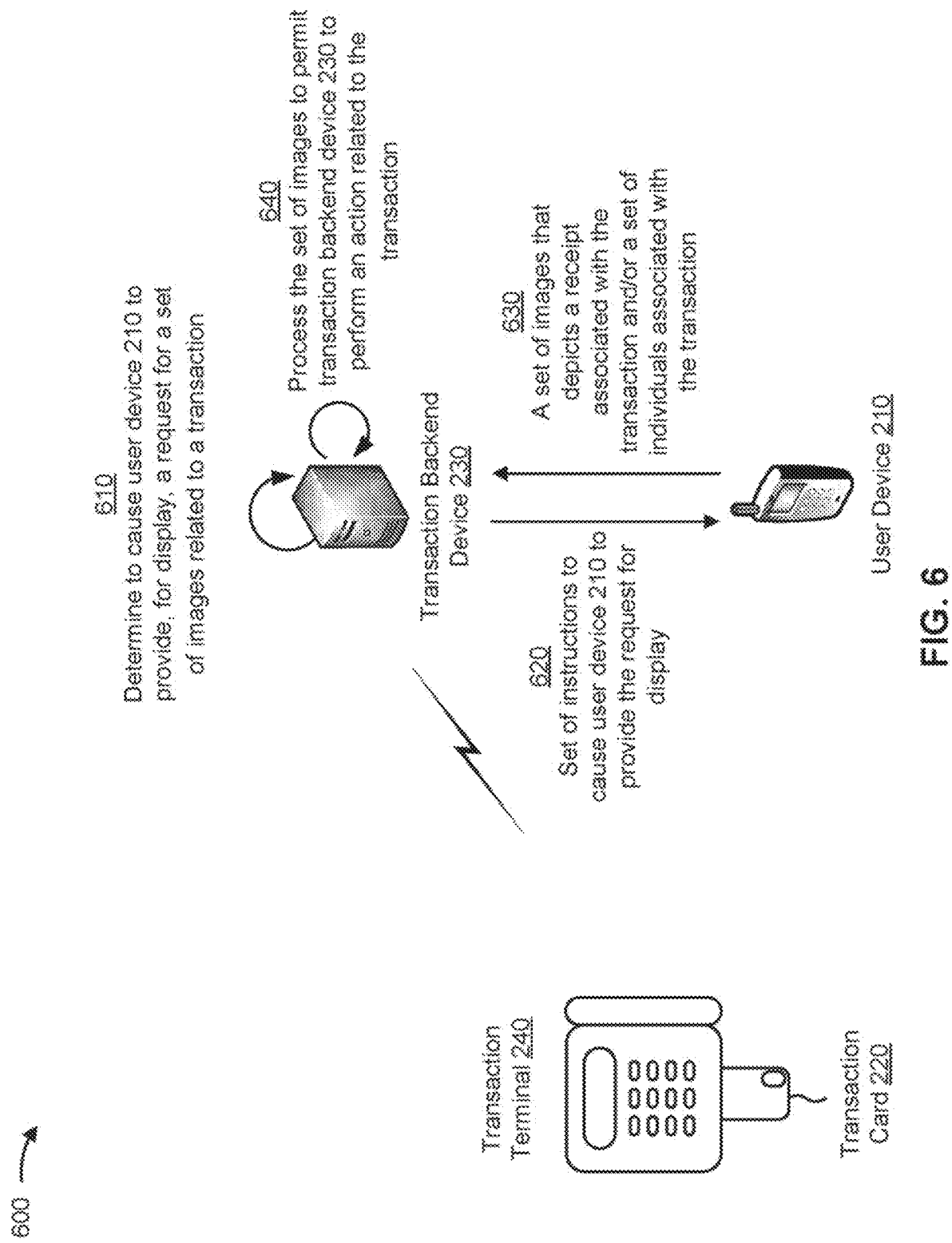
FIG. 6 is a diagram of an example implementation relating to the example process shown in FIG. 4 and/or the example process shown in FIG. 5.

FIG. 6 is a diagram of an example implementation 600 relating to example process 400 shown in FIG. 4 and/or example process 500 shown in FIG. 5.

As shown in FIG. 6, and by reference number 610, transaction backend device 230 may determine to cause user device 210 to provide, for display, a request for a set of images related to a transaction. For example, transaction backend device 230 may determine to cause user device 210 to provide, for display, a request for an image of a receipt, a set of images of a set of individuals associated with a transaction, an image of transaction card 220, and/or the like. As shown by reference number 620, transaction backend device 230 may provide a set of instructions to cause user device 210 to provide the request for display. For example, transaction backend device 230 may provide a set of instructions after identifying user device 210 as being associated with the transaction.

As shown by reference number 630, user device 210 may provide a set of images that depicts a receipt associated with the transaction and/or a set of individuals associated with the transaction. For example, user device 210 may provide the set of images after capturing the set of images. As shown by reference number 640, user device 210 may process the set of images to permit transaction backend device 230 to perform an action related to the transaction. For example, transaction backend device 230 may process the set of images to permit transaction backend device 230 to perform an analysis related to the transaction, in a manner similar to that described elsewhere herein. Continuing with the previous example, user device 210 may process the set of images to confirm information related to a transaction that transaction backend device 230 receives from transaction terminal 240, to confirm an identity of a set of individuals associated with a transaction (e.g., by processing an image using a facial recognition technique), and/or the like.

As indicated above, FIG. 6 is provided merely as an example. Other examples are possible and may differ from what was described with regard to FIG. 6.

Figure 7:
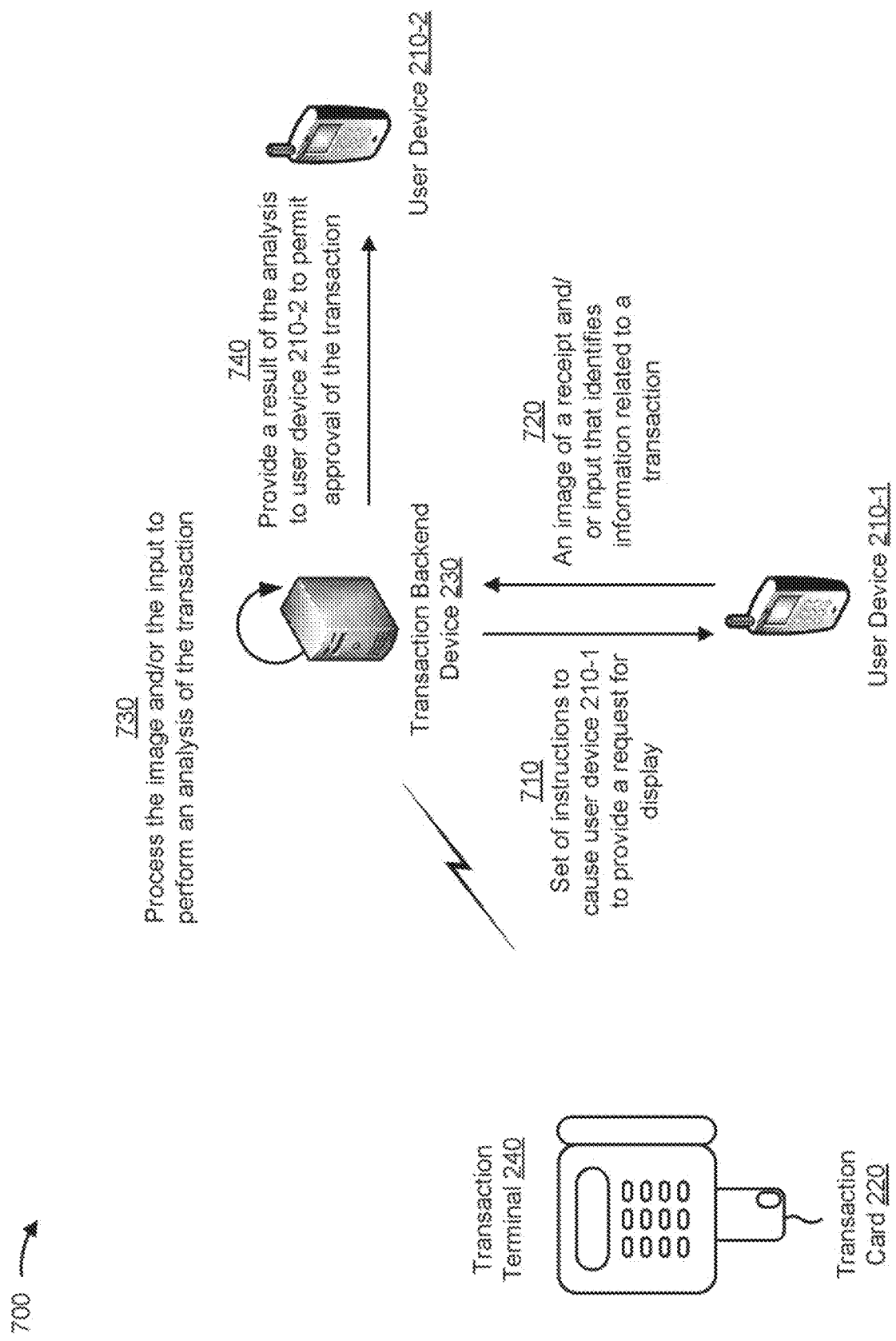
FIG. 7 is a diagram of an example implementation relating to the example process shown in FIG. 4 and/or the example process shown in FIG. 5.

FIG. 7 is a diagram of an example implementation 700 relating to example process 400 shown in FIG. 4 and/or example process 500 shown in FIG. 5.

As shown in FIG. 7, and by reference number 710, transaction backend device 230 may provide a set of instructions to cause user device 210-1 to provide a request for display. For example, the request may be related to causing a user of user device 210-1 to capture an image of a receipt related to a transaction, an image of a set of individuals associated with a transaction, an image of transaction card 220, and/or the like. As shown by reference number 720, user device 210 may provide an image of a receipt and/or input that identifies information related to a transaction. For example, user device 210 may provide an image and/or information in a manner similar to that described elsewhere herein.

As shown by reference number 730, transaction backend device 230 may process the image and/or the input to perform an analysis of the transaction. For example, transaction backend device 230 may process the image and/or the information to determine whether a transaction satisfies a set of rules, whether a user of transaction card 220 is an actual cardholder of transaction card 220, whether information shown in the image and/or included in the input matches other information received from transaction terminal 240, and/or the like. As shown by reference number 740, transaction backend device 230 may provide a result of the analysis to user device 210-2 to permit approval of the transaction. For example, a user of user device 210-2 may review and/or approve the transaction and user device 210-2 may provide information to transaction backend device 230 that identifies that the transaction was reviewed and/or approved. In some implementations, transaction backend device 230 may update a record associated with the transaction to identify that the transaction was reviewed and/or approved, may update information related to an account associated with transaction card 220 and/or a user of user device 210-1 to identify review and/or approval of the transaction, and/or the like.

As indicated above, FIG. 7 is provided merely as an example. Other examples are possible and may differ from what was described with regard to FIG. 7.

Figure 8:
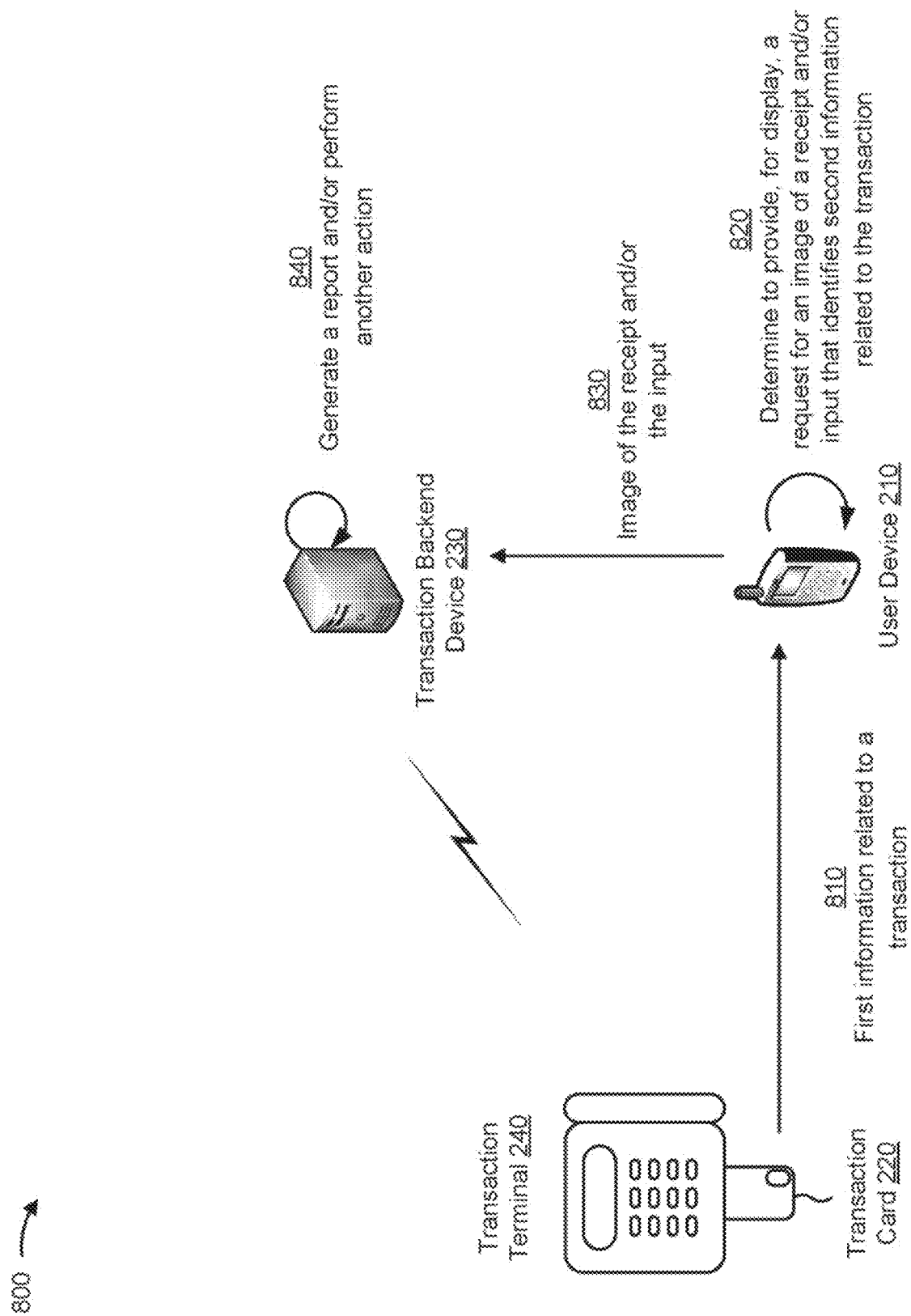
FIG. 8 is a diagram of an example implementation relating to the example process shown in FIG. 4 and/or the example process shown in FIG. 5.

FIG. 8 is a diagram of an example process 800 relating to example process 400 shown in FIG. 4 and/or example process 500 shown in FIG. 5.

As shown in FIG. 8, and by reference number 810, transaction card 220 may provide first information related to a transaction for which transaction card 220 is being used to complete. For example, transaction card 220 may provide first information to user device 210 after a user has moved transaction card 220 within communicative proximity of transaction terminal 240. In some implementations, first information may identify a value associated with a transaction, a party associated with a transaction, a card number of transaction card 220, a date and/or time of a transaction, and/or the like, similar to that described elsewhere herein.

As shown by reference number 820, user device 210 may determine to provide, for display, a request for an image of a receipt and/or input that identifies second information related to the transaction. For example, in some implementations, the second information may identify a user of user device 210, a value associated with transaction card 220, a set of individuals associated with transaction card 220, and/or the like, similar to that described elsewhere herein.

As shown by reference number 830, user device 210 may provide the image of the receipt and/or the input to transaction backend device 230. For example, user device 210 may provide the image and/or the second information to permit transaction backend device 230 to process the image and/or the input, such as to perform an analysis of the information. As shown by reference number 840, transaction backend device 230 may generate a report and/or perform another action. For example, transaction backend device 230 may generate a report related to the transaction, perform an analysis related to the transaction, and/or the like, in a manner similar to that described elsewhere herein.

As indicated above, FIG. 8 is provided merely as an example. Other examples are possible and may differ from what was described with regard to FIG. 8.

In this way, transaction backend device 230 may automatically prompt a user of user device 210 for information related to a transaction, such as an image of a receipt related to the transaction and/or other information related to the transaction. This increases an efficiency of verifying and/or approving a transaction via automatic prompting for information related to the transaction. In addition, this conserves computing resources that would otherwise be consumed via manual use of a device to approve transactions. Further, this increases a security of transactions via real-time monitoring of the transactions.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
    receiving, by a user device, a notification from a transaction backend device, based on information associated with a distance between the user device and another device, associated with the transaction, satisfying a threshold distance,
        the notification including data associated with a request for an image of values associated with a receipt relating to a transaction associated with the transaction backend device, and
        the notification being based on information associated with the transaction satisfying a threshold;
    providing, for display by the user device, information associated with the notification indicating the request;
    activating, by the user device and based on receiving the notification, a camera associated with the user device;
    initiating, by the user device and based on receiving the notification, a timer that provides an indication of an amount of time to when the user device will capture the image of values automatically;
    modifying, by the user device and after initiating the timer, the image of values; and
    providing, by the user device and to the transaction backend device, the image of values and verification information associated with verifying or approving the transaction.

2. The method of claim 1, further comprising:
    providing, for display, another request that requests input of particular information related to the transaction,
        the particular information being different from the image of values.

3. The method of claim 1, further comprising:
    providing, to the transaction backend device, an input that identifies particular information that is different from the image of values.

4. The method of claim 3, where the particular information identifies one or more individuals associated with the transaction, and
    where the one or more individuals are not associated with the user device or a transaction card being used for the transaction.

5. The method of claim 3, where the particular information identifies a location associated with the transaction.

6. The method of claim 1, further comprising:
    receiving, from the transaction backend device, data that causes the user device to display analysis results associated with the transaction.

7. The method of claim 1, wherein the information associated with the transaction is a value associated with the transaction, and
wherein the threshold is a threshold value associated with the transaction.

8. The method of claim 1, wherein modifying the image of values includes at least one of:
changing a focus of the image of values, or
processing the image of values using an image processing technique.

9. The method of claim 1, further comprising:
providing another request for biometric information; and
providing, to the transaction backend device, the biometric information.

10. A device comprising:
one or more memories; and
one or more processors, communicatively coupled to the one or more memories, to:
receive a notification from a transaction backend device, based on information associated with a distance between the device and another device, associated with the transaction, satisfying a threshold distance,
the notification including data associated with a request for an image of values associated with a receipt relating to a transaction associated with the transaction backend device, and
the notification being based on information associated with the transaction satisfying a threshold;
provide, for display by the device, information associated with the notification indicating the request;
activate, based on receiving the notification, a camera associated with the device;
initiate, based on receiving the notification, a timer that provides an indication of an amount of time to when with the device will capture the image of values automatically;
modify, after activating the camera and after initiating the timer, the image of values; and
provide, to the transaction backend device, the image of values and verification information associated with verifying or approving the transaction.

11. The device of claim 10, where the one or more processors are further to:
provide, for display, another request that requests input of particular information related to the transaction,
the particular information being different from the image of values.

12. The device of claim 10, where the one or more processors are further to:
provide, to the transaction backend device, an input that identifies particular information that is different from the image of values.

13. The device of claim 12, where the particular information identifies one or more individuals associated with the transaction, and
where the one or more individuals are not associated with a transaction card being used for the transaction.

14. The device of claim 12, where the particular information identifies a location associated with the transaction.

15. The device of claim 10, where the one or more processors are further to:
receive, from the transaction backend device, data that causes the device to display analysis results associated with the transaction.

16. The device of claim 10, where the one or more processors are further to:
provide biometric information related to verifying the transaction.

17. A non-transitory computer-readable medium storing instructions, the instructions comprising:
one or more instructions that, when executed by one or more processors, cause the one or more processors to:
receive a notification from a transaction backend device, based on information associated with a distance between a device associated with the one or more processors, and another device associated with the transaction, satisfying a threshold distance,
the notification including data associated with a request for an image of values associated with a receipt relating to a transaction associated with the transaction backend device;
provide, for display by the device, information associated with the notification indicating the request;
activate, based on receiving the notification, a camera associated with the one or more processors;
initiate, based on receiving the notification, a timer that provides an indication of an amount of time to when the device will capture the image of values;
modify, after activating the camera and after initiating the timer, the image of values;
provide, to the transaction backend device, the image of values; and
provide, to the transaction backend device, an input that identifies particular information that is different from the image of values,
where the particular information identifies biometric information related to verifying the transaction.

18. The non-transitory computer-readable medium of claim 17, where the one or more instructions, when executed by the one or more processors, further cause the one or more processors to:
provide, for display, another request that requests input of particular information related to the transaction,
the particular information being different from the image of values.

19. The non-transitory computer-readable medium of claim 17, where the one or more instructions, when executed by the one or more processors, further cause the one or more processors to:
receive, from the transaction backend device, data that causes the device to display analysis results associated with the transaction.

20. The non-transitory computer-readable medium of claim 17, where the one or more instructions, when executed by the one or more processors, further cause the one or more processors to:
provide another request for biometric information; and
provide, to the transaction backend device, the biometric information.

* * * * *